United States Patent
Ogawa et al.

(10) Patent No.: US 7,154,692 B2
(45) Date of Patent: Dec. 26, 2006

(54) AUTOMATIC ADJUSTMENT OF MAGNETIC DISK PROTECTION APPARATUS AND METHOD ACCORDING TO ENVIRONMENT

(75) Inventors: Mitsuru Ogawa, Sagamihara (JP); Susumu Shimotono, Hadano (JP); Akiyoshi Tanaka, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 10/955,827

(22) Filed: Sep. 30, 2004

(65) Prior Publication Data

US 2005/0073764 A1 Apr. 7, 2005

(30) Foreign Application Priority Data

Oct. 3, 2003 (JP) ............................ 2003-346416

(51) Int. Cl.
*G11B 15/12* (2006.01)
(52) U.S. Cl. ...................................... 360/61
(58) Field of Classification Search .................... None
See application file for complete search history.

(56) References Cited

U.S. PATENT DOCUMENTS 6,570,726 B1 * 5/2003 Mutoh .......................... 360/60
6,771,440 B1 * 8/2004 Smith ........................... 360/31
6,952,318 B1 * 10/2005 Ngo .............................. 360/69
7,023,640 B1 * 4/2006 Codilian et al. .............. 360/60
2001/0043423 A1 * 11/2001 Serrano et al. ............... 360/69

FOREIGN PATENT DOCUMENTS

JP 07-057376 3/1995

* cited by examiner

*Primary Examiner*—Wayne Young
*Assistant Examiner*—Glenda P. Rodriguez
(74) *Attorney, Agent, or Firm*—Mark E. McBurney

(57) ABSTRACT

A portable information processing apparatus in provided with a magnetic disk device switchable to a state providing increased resistance to physical shock upon prediction that such a shock is likely. Under predetermined conditions, a second prediction may be issued that such a shock is no longer likely, allowing the magnetic disk device to switch to a normal state of operations. The shock-resistant state of the magnetic disk device can prevent data access and thus inhibit the progress of important process(es). Upon recognition that an important process is being delayed, the condition for issuing the second prediction may be relaxed to more quickly return the magnetic disk device to a normal operating state.

23 Claims, 12 Drawing Sheets

FIG. 2
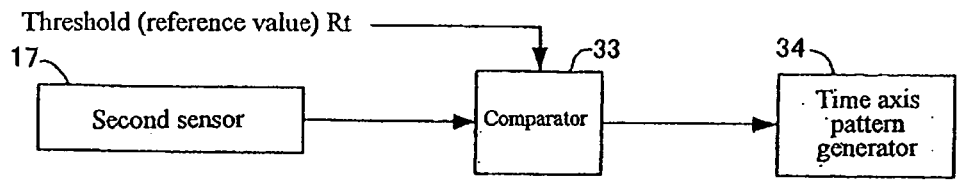
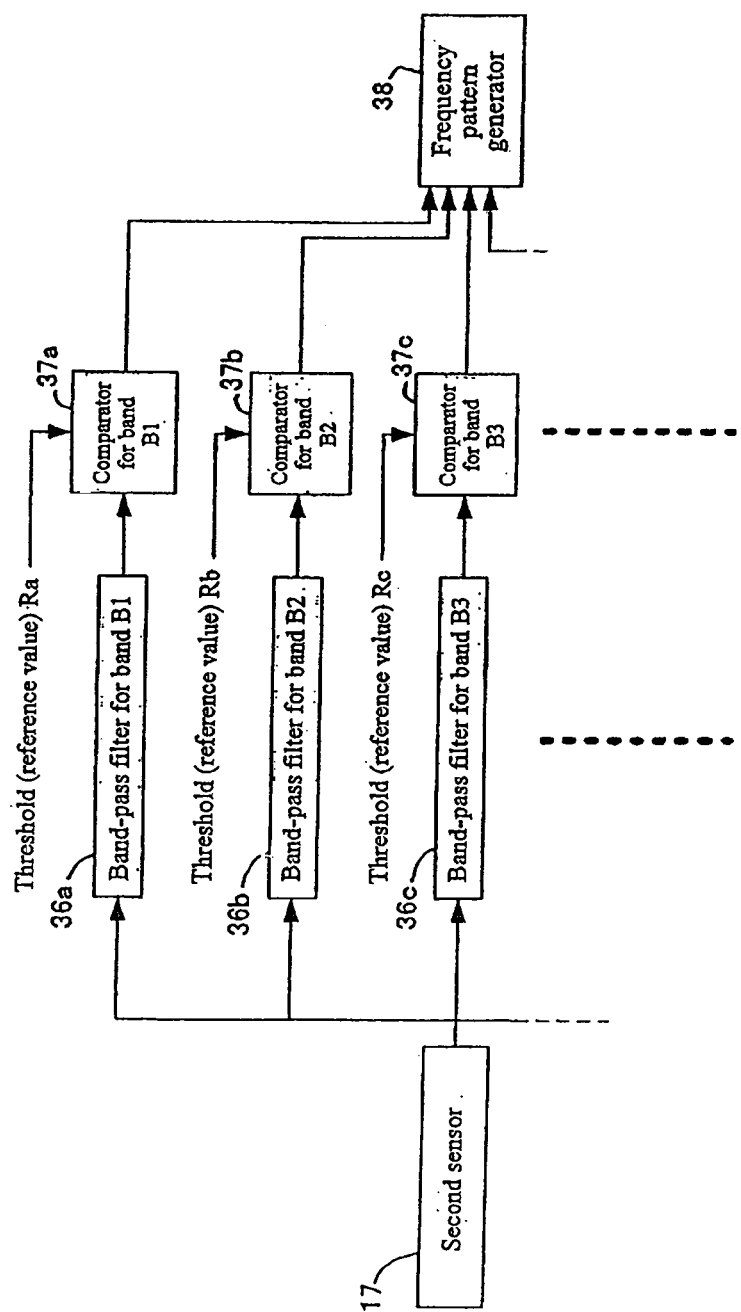
FIG. 3

AUTOMATIC ADJUSTMENT OF MAGNETIC DISK PROTECTION APPARATUS AND METHOD ACCORDING TO ENVIRONMENT

BACKGROUND

The present invention relates to a portable information processing apparatus and associated method, program, and recording medium for controlling the information processing apparatus and, in particular, to an information processing apparatus that has a protection function for a magnetic disk device and a power-saving function, and a method, program, and recording medium for controlling the information processing apparatus.

See Published Unexamined Patent Application No. 7-57376 for disclosure of a technology that detects the height and attitude of a magnetic head from the surface of a magnetic disk in a magnetic disk device by comparing an actual reproduction signal with a reference reproduction signal and, if an abnormal height or attitude is found, notifies a user that a head crash or sliding is likely to occur.

A portable PC (personal computer) such as a notebook PC and a tablet PC is provided with a power-saving state such as suspend or hibernation mode for saving electric power of its built-in battery, in addition to a power state for normal operation of the information processing apparatus. In order to place the apparatus in such a power-saving state, an appropriate program is activated and performs the switching operation. Because the program is used only when switching the apparatus to a power-saving state and not in normal operation, the program is typically saved in a page memory file managed by a virtual memory management service. That is, many of memory areas that are found to be less frequently used from an execution history are temporarily saved in a page memory file to provide free real physical memory areas, thereby increasing apparent memory size. In many cases where a less frequently used executable program is to be executed, the execution code saved in the page memory file is retrieved, loaded in a physical memory, and then executed. In other words, placing the apparatus in a power-saving state entails data read/write operations (hereinafter referred to as "disk access" as appropriate) on a magnetic disk device.

Japanese Patent Application No. 2003-306161 (filed on Aug. 29, 2003 and not published as of the date of filing the present application) discloses an approach in which an impact to a magnetic disk device is predicted from an output from an acceleration sensor provided in an information processing apparatus and the magnetic disk device is placed in a shock-resistant state based on the prediction. In particular, in the shock-resistant state, a head is moved to a position in which the head does not face the surface of a magnetic disk. However, it is difficult to access the disk in such a state.

A user of a PC having the function of switching to a power-saving state and a protection function for protecting its magnetic disk device against a possible impact to the PC may shut the lid, which is a liquid-crystal-display panel, of the notebook PC and moves to another place with the PC. In such a case, the user stands up from a chair and lifts the PC from the desk, and therefore a strong shake of the PC is detected. The hard disk protection function of the magnetic disk device may regard the shake as a sign that the PC is about to fall and places the magnetic disk device in a shock-resistant state, in which the disk is inaccessible, ahead of time. Then, the user walks to the place with the PC, and accordingly, the PC is continuously shaken. If the user's travel time is long, the magnetic disk device is prevented from returning to an accessible state for a long time. As a result, the magnetic disk device is suspended from entering a power-saving state for a long period of time and consequently the battery life is reduced. If the battery of the magnetic disk device is nearly exhausted and the device is suspended from entering the power-saving state for a long time, data may be lost due to battery shutoff.

An object of the present invention is to provide an information processing apparatus and an information processing apparatus control method, program, and recording medium that prevent a protection function of a magnetic disk device for proactively reacting to a possible impact from hindering the progress of predetermined process.

SUMMARY OF THE INVENTION

An information processing apparatus according to the present invention is capable of being taken along by a user and includes: a magnetic disk device capable of being switched between a first shock-resistant state in which data access to a magnetic disk by a head is enabled and second shock-resistant state in which data access to the magnetic disk by the head is disabled and a shock resistance higher than that in the first shock-resistant state is provided;

at least one first sensor for detecting a first shock-predictive physical quantity, the first shock-predictive physical quantity being a basis for issuing a first prediction that a shock to the magnetic disk device occurs;

at least one second sensor for detecting a second shock-predictive physical quantity, the second shock-predictive physical quantity being a basis for issuing a second prediction that a shock to the magnetic disk device does not occur;

first prediction means for issuing the first prediction on the basis of an output from the first sensor;

a first magnetic disk device switching means for switching the magnetic disk device from the first shock-resistant state to the second shock-resistant state on condition that the first prediction is issued;

second prediction means for issuing the second prediction on the basis of an output from the second sensor after the first magnetic disk device switching means switches the magnetic disk device from the first shock-resistant state to the second shock-resistant state;

second magnetic disk device switching means for switching the magnetic disk device from second shock-resistant state to the first shock-resistant state on condition that the second prediction is issued; and condition relaxing means for relaxing a condition for the second prediction means to issue the second prediction if a progress of a predetermined process in the information processing apparatus is prevented because data access to the magnetic disk device is disabled due to the second shock-resistant state of the magnetic disk device.

The present invention relates to a method for controlling a given portable information processing apparatus which includes a magnetic disk device capable of being switched between a first shock-resistant state in which data access to a magnetic disk by a head is enabled and second shock-resistant state in which data access to the magnetic disk by the head is disabled and a shock resistance higher than that in the first shock-resistant state is provided;

at least one first sensor for detecting a first shock-predictive physical quantity, the first shock-predictive physical quantity being a basis for issuing a first prediction that a shock to the magnetic disk device occurs;

at least one second sensor for detecting a second shock-predictive physical quantity, the second shock-predictive physical quantity being a basis for issuing a second prediction that a shock to the magnetic disk device does not occur.

The information processing apparatus control method according to the present invention includes: a first step of issuing the first prediction on the basis of an output from the first sensor;

a second step of switching the magnetic disk device from the first shock-resistant state to the second shock-resistant state on condition that the first prediction is issued;

a third step of issuing the second prediction on the basis of an output from the second sensor after the magnetic disk device is switched from the first shock-resistant state to the second shock-resistant state;

a fourth step of switching the magnetic disk device from second shock-resistant state to the first shock-resistant state on condition that the second prediction is issued; and a fifth step of relaxing a condition for the second prediction means to issue the second prediction if a progress of a predetermined process in the information processing apparatus is prevented because data access to the magnetic disk device is disabled due to the second shock-resistant of the magnetic disk device.

A program of the present invention causes a computer to function as the means included in the information processing system. A recording medium of the present invention has the program recorded on it in a computer-readable manner.

When a given impact to a magnetic disk device is predicted, the magnetic disk device is temporarily placed in a shock-resistant state for protecting the device and disk access in the magnetic disk device is disabled. While a user is traveling with an information processing apparatus, the progress of a predetermined process in the information processing apparatus can be prohibited by the above-mentioned protection activated in response to detection of a continuous shakes of the information processing apparatus.

A predetermined process performed in the information processing apparatus may require access to a disk in the magnetic disk device. If the magnetic disk device is slow to return to a state in which its disk is accessible, the process cannot be completed and may cause a problem. According to the present invention, a condition for returning a magnetic disk device from a shock-resistant state in which protection measures are taken to a disk access enabled state is relaxed to avoid suspending a predetermined process for an excessively long period of time. Thus, problems associated with an excessively prolonged hold state can be avoided.

BRIEF DESCRIPTION OF THE DRAWINGS

For a more complete understanding of the present invention and the advantages thereof, reference is now made to the following description taken in conjunction with the accompanying drawings.

FIG. 2 is a functional block diagram of a component section for generating pattern information relating to a time axis;

FIG. 3 is a functional block diagram of a component section for generating pattern information relating to a frequency axis;

DETAILED DESCRIPTION OF EMBODIMENTS OF THE PRESENT INVENTION

Hereinafter, the present invention will be described through one or more embodiments. However, the following embodiments are not intended to limit the present invention according to claims, and all combinations of features described in the embodiment are not necessarily essential to the solving means of the present invention.

Figure 1:
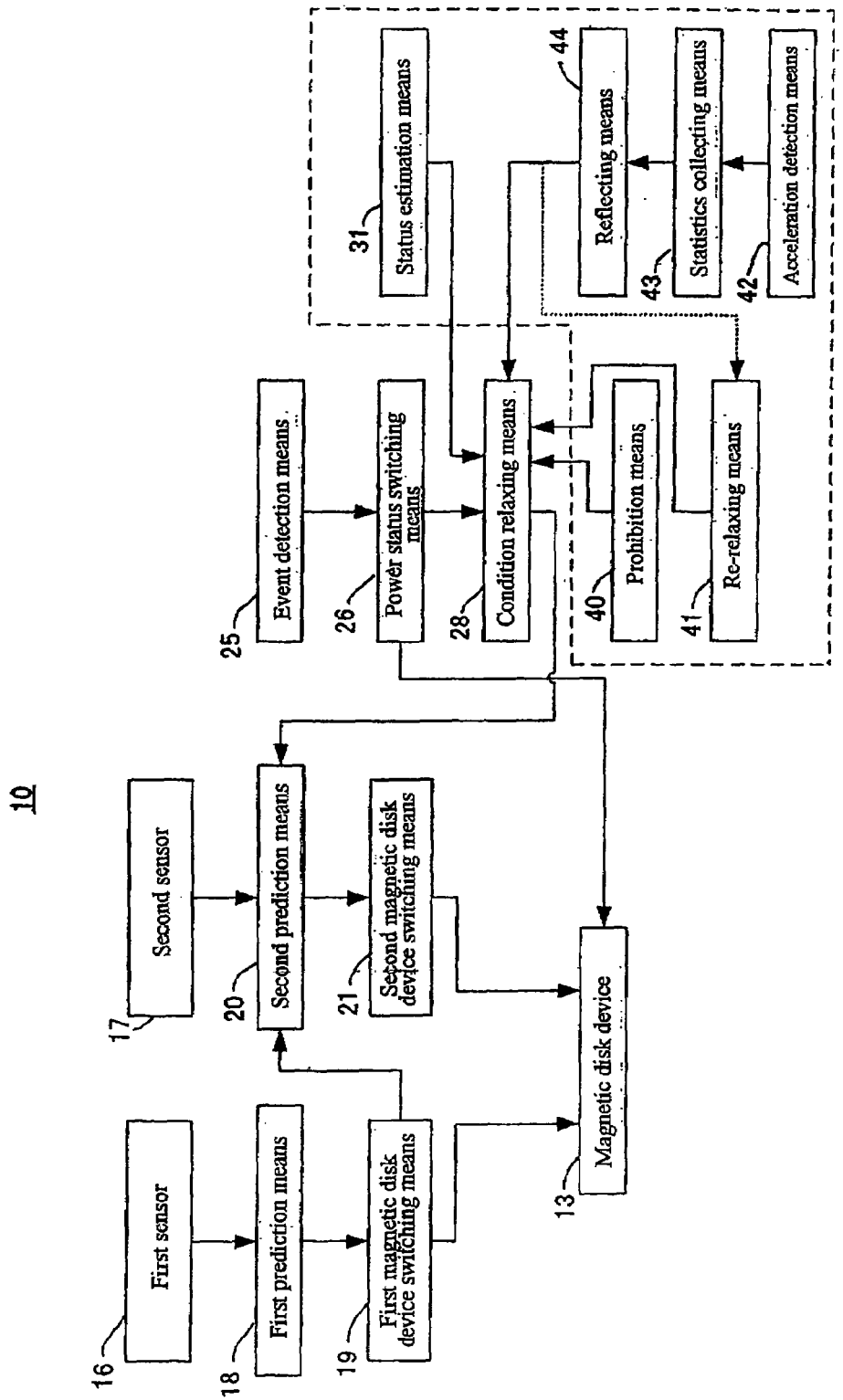
FIG. 1 is a block diagram showing a configuration of an information processing apparatus.

FIG. 1 is a block diagram showing a configuration of an information processing apparatus 10. The portable information processing apparatus 10 includes a magnetic disk device 13, a first sensor 16, a second sensor 17, first prediction means 18, first magnetic disk device switching means 19, second prediction means 20, second magnetic disk device switching means 21, and a condition relaxing means 28. Also shown in FIG. 1 are event detection means 25, power status switching means 26, status estimation means 31, prohibition means 40, re-relaxing means 41, acceleration detection means 42, statistics collecting means 43, and reflecting means 44, which are optionally added to the information processing apparatus 10.

The magnetic disk device 13 can be switched between a first shock-resistant state in which a head can write/read data to/from a magnetic disk and a second shock-resistant state in which the head cannot write/read data to/from the magnetic disk and a shock resistance higher than that in the first shock-resistant state is provided. At least one first sensor 16 detects a first shock-predictive physical quantity that provides a basis for issuing a first prediction that a shock to the magnetic disk device 13 will occur. At least one second sensor 17 detects a second shock-predictive physical quantity that provides a basis for issuing a second prediction that a shock to the magnetic disk device 13 will not occur. The first prediction means 18 issues the first prediction based on an output from the first sensor 16. The first magnetic disk device switching means 19 switches the magnetic disk device 13 from the first shock-resistant state to the second shock-resistant state on condition that the first prediction is issued. The second prediction means 20 issues the second prediction based on an output from the second sensor 17 after the first magnetic disk device switching means 19 switches the magnetic disk device 13 from the first shock-resistant state to the second shock resistant state. The second magnetic disk device switching means 21 switches the magnetic disk device 13 from the second shock-resistant state to the first shock-resistant state on condition that the second prediction is issued. The condition relaxing means 28 relaxes a condition for the second prediction means 20 to issue the second prediction if the progress of a predetermined process performed in the information processing apparatus 10 is inhibited because data cannot be written or read due to the second shock-resistant state of the magnetic disk device 13.

The information processing apparatus 10 may be any information processing apparatus, including notebook personal computers and tablet computers, that is equipped with a CPU and can be taken along by a user. The magnetic disk device 13 may be an internal hard disk device or a removable hard disk device. The shock-predictive physical quantity includes at least a mechanical physical quantity. The mechanical physical quantity may include at least an acceleration (including angular acceleration), speed (including angular speed), displacement, and force. The first and second sensors may be any sensors that detect shock-predictive physical quantities in each of the directions of three axes perpendicular to one another. They may be acceleration sensor, for example. A "predetermined process" in the phrase "the progress of a predetermined process performed in the information processing apparatus 10 is inhibited" is not limited to a process for switching the power status of the information processing apparatus 10 from a normal power state to a power-saving state. Instead, it includes any other processes. For example, if disk access is requested during a system boot process or shutdown process, the disk access may fail to be completed and the process may fail to end because the magnetic disk device 13 in the second shock-resistant state and data read/write is prohibited.

If the first prediction means 18 predicts a shock to the information processing apparatus 10 such as a drop of the information processing apparatus 10, the first prediction means 18 issues a first prediction. The first magnetic disk device switching means 19 switches the magnetic disk device 13 from the first shock-resistant state to the second shock-resistant state in response to the issuance of the first prediction. Consequently, the magnetic disk device 13 enters a state in which the head cannot read/write data on a magnetic disk. A shock to the information processing apparatus 10 can also occur from handling, besides a fall of the information processing apparatus 10, and as a result the first prediction may be issued. In that case, if disk access is required for completing a predetermined process in the information processing apparatus 10, the predetermined process is put on hold until disk access is enabled. However, the shock can persistently be beyond an allowable level and accordingly the issuance of the second prediction is delayed, thus everlastingly prohibiting the completion of the predetermined process. To prevent this, if the progress of a predetermined process performed in the information processing apparatus 10 is prohibited because of a disk access disabled state, the condition relaxing means 28 relaxes the condition for the second prediction means 20 to issue the second prediction. As a result, the magnetic disk device 13 immediately returns to a state in which disk access is enabled and consequently the predetermined process can be quickly completed. In this way, the problem of lengthy delay in the completion of the predetermined process can be solved.

The expression "relaxes the condition" in the phrase "relaxes the condition for the second prediction means 20 to issue the second prediction" means that the condition for issuing the second prediction is relaxed for example as follows: (i) conditions A, B are reduced to condition A (the reduction of the number of conditions) or (ii) a minor condition is changed to a major condition (for example, in the expression "if a, then b; if b, then c; therefore if a, then c," a is defined as a minor condition and b is defined as a major condition). The condition is relaxed in such a way that the situations that meet a changed condition include all the conditions that meet the original condition. Specifically, a threshold value is used for changing the condition.

The components of the information processing apparatus 10 can be embodied in various forms and additional components may be added. Some of various forms of components and additional components will be described below. These are presented only as illustrative examples of specific preferred embodiments of the present invention and do not limit the technical idea of the apparatus of the present invention.

At least one event detection means 25 detects an event that provides a basis for determination as to whether the information processing apparatus 10 should be switched from a first power state to a second lower power state. The power status switching means 26 switches the information processing apparatus 10 from the first power state to the second power state based on an output from the event detection means 25. The above-mentioned predetermined process performed in the information processing apparatus 10 is the power status switching process performed by the power status switching means 26.

The first power state may be the power state of a PC in its normal use. The second power state may be a power-saving state with respect to the normal power state. The power-saving state may include standby, suspend, and hibernation states, for example. The second power state may be a shutdown state. All or some of a plurality of first shock-predictive physical quantities may be identical to all or some of a plurality of second shock-predictive physical quantities.

It should be noted that before switching a power state, the power status switching means 26 may access a disk directly or indirectly through a virtual memory function. The disk access may be reading predetermined data from the magnetic disk device 13, writing data to the magnetic disk device 13, or both reading and writing data. If the second power state is a suspend state, data in virtual memory is read, that is, data in the magnetic disk device 13 may be read, or given data in real memory is swapped out to virtual memory, that is, data is written in the magnetic disk device 13, or data is written in the magnetic disk device 13 by an application for data backup, before the suspend state is entered.

When a user at a site stops using the information processing apparatus 10 in order to move to another place with the information processing apparatus 10, an event such as shutting the lid of the information processing apparatus 10 is detected and the function of placing the information processing apparatus 10 in a low-power state is activated. Before this switching, it may be necessary that given data be read from or written to the magnetic disk device 13. When the information processing apparatus 10 is carried and moved by a user, the first shock-predictive physical quantity tends to match the value at which the first prediction means 18 predicts a possible shock to the information processing apparatus 10. As a result, the first prediction is issued and the magnetic disk device 13 is placed in a state in which the head cannot read/write data on a magnetic disk for protection against the possible shock. When the magnetic disk device 13 enters the data read/write disabled state, the switching of the information processing apparatus 10 to the low-power state is suspended because the given data that must be read/written in the magnetic disk device 13 in advance cannot be read/written. If the progress of a process for switching to the second power state is prohibited because data cannot be read/written due to the second shock-resistant state of the magnetic disk device 13, the condition relaxing means 28 relaxes the condition for issuing the second prediction. As a result, the magnetic disk device 13 immediately returns to the data read/write enabled state, thereby avoiding lengthy suspension of the process for switching the information processing apparatus 10 to the low-power state.

In the first shock-resistant state, the head of the magnetic disk device faces a magnetic disk. In the second shock-resistant state, the head does not face the magnetic disk.

When the head of the magnetic disk device is in a position where it does not face the magnetic disk, a head crash onto the magnetic disk is avoided even if the head is displaced by a shock. Thus, the shock resistance of the magnetic disk device is improved.

The second prediction means 20 compares a value corresponding to an output from the second sensor 17 with a threshold value and issues the second prediction depending on the result of the comparison. The condition relaxing means 28 changes the threshold value to change the condition for issuing the second prediction.

Relaxation of the condition for the second prediction means 20 to issue the second prediction is not limited to reduction of the threshold. Relaxation of the condition for the second prediction means 20 to issue the second prediction may be accomplished by increasing the threshold value.

The information processing apparatus 10 has status estimation means 31. The status estimation means 31 estimates how the information processing apparatus 10 is being used by the user when the first magnetic disk device switching means 19 switches the magnetic disk device 13 from the first shock-resistant state to the second shock-resistant state. The condition relaxing means 28 changes the threshold based on the status estimated by the status estimation means 31.

The status estimation means 31 may estimate the status of the information processing apparatus 10 based on outputs from the first sensor 16, the second sensor 17 and/or other sensors. The status estimation means 31 may also estimate the status of the information processing apparatus 10 based on the movement of a screen cursor. For example, if the cursor is moving, it can be estimated that the user is operating a pointing device provided for the unit of the information processing apparatus 10. For another example, when the first prediction is issued while the LCD (liquid-crystal-display) panel of the information processing apparatus 10 is open, it can be estimated that the user is moving the information processing apparatus 10 from one desk to another desk at a relatively short distance with the LCD panel being open. Furthermore, if the first prediction is issued while the LCD panel of the information processing apparatus 10 is closed, it can be estimated that the user is moving the information processing apparatus 10 over a long distance. The threshold value for relaxing the condition for issuing the second prediction may be changed by different amounts in movements for short and long distances.

The second prediction means 20 issues the second prediction based on pattern information relating to the time axis and/or frequency axis of outputs from the second sensor 17.

Pattern information relating to the time axis consists of a series of outputs based on the results of comparison between outputs from the second sensor 17 and each threshold at different points of time. The condition relaxing means 28 changes the threshold to change the condition.

FIG. 2 is a functional block diagram of a component section for generating pattern information relating to the time axis. Outputs from the second sensor 17 are provided to a comparator 33. The comparator 33 compares an input C from the sensor 17 with a predetermined threshold value Rt at predetermined time intervals and, if and only if $C \geq Rt$, generates a pulse having a predetermined width. A time axis pattern generator 34 generates a pattern relating to the time axis direction for the second shock-predictive physical quantity on the basis of a predetermined number of inputs provided from the comparator 33 or inputs provided from the comparator 33 in a predetermined period of time. The pattern is compared with a predetermined reference pattern in the second prediction means 20 in order to issue the second prediction. The condition relaxing means 28 adjusts the threshold value Rt.

Pattern information relating to the frequency axis consists of a set of outputs based on the results of comparison between each of the frequency components of outputs from the second sensor 17 and each threshold value. The condition relaxing means 28 changes the threshold to change the condition.

FIG. 3 is a functional block diagram of a component section for generating pattern information relating to the frequency axis. Outputs from the second sensor 17 are sent to band-pass filters 36a, 36b, 36c, . . . of different frequency bands B1, B2, B3, . . . (B1<B2<B3< . . . ). Outputs Ca, Cb, Cc, . . . from the band-pass filters 36a, 36b, 36c, . . . are input into comparators 37a, 37b, 37c, . . . , and compared with threshold Ra, Rb, Rc, . . . , respectively. If an input is greater than or equal to its threshold, a pulse having a predetermined width is generated. A frequency pattern generator 38 generates a frequency pattern based on inputs from the comparators 37a, 37b, 37c, . . . . The frequency pattern is compared with a predetermined reference pattern in the second prediction means 20 for issuing the second prediction. The condition relaxing means 28 adjusts the threshold Ra, Rb, Rc, . . . .

As many comparators 33 shown in FIG. 2 as comparators 37a, 37b, 37c, . . . are provided and outputs from the comparators 37a, 37b, 37c, . . . are input into the comparators 33, where they are compared with thresholds Rta, Rtb, Rtc, . . . , respectively. Outputs from the comparators 33 are input into the time axis pattern generator 34, which generates a pattern having both frequency and time axis as its components. Based on this combined pattern, the second prediction can be issued or each threshold can be adjusted.

Returning to FIG. 1, the prohibition means 40 prohibits the condition relaxing means 28 from changing a condition for a predetermined period of time after the magnetic disk device 13 is switched from the first shock-resistant state to the second shock-resistant state by the first magnetic disk device switching means 19.

The information processing apparatus 10 further includes a re-relaxing means 41. If a data read/write disabled state of the magnetic disk device 13 continues for a predetermined period of time after a condition is relaxed by the condition relaxing means 28, the re-relaxing means 41 causes the condition relaxing means 28 to further relax the condition for issuing the second prediction again.

The further relaxation of the condition in the condition relaxing means 28 by the re-relaxing means 41 may be accomplished by changing the threshold described above, for example. The further relaxation of the condition in the condition relaxing means 28 does not have to be performed at once. The relaxation may be accomplished stepwise over a predetermined number of different times at predetermined time intervals.

The information processing apparatus 10 further includes acceleration detection means 42, statistics collecting means 43, and reflecting means 44. The acceleration detection means 42 detects acceleration that acts on the housing of the information processing apparatus 10. The statistics collecting means 43 collects statistics concerning the history of acceleration acting on the housing of the information processing apparatus 10 after the event detection means detects an event. The reflecting means 44 reflects the statistics collected by the statistics collecting means 43 in the degree of condition relaxation by the condition relaxing means 28.

In FIG. 1, the dotted arrow line from the reflecting means 44 to the re-relaxing means 41 represents that the reflecting means 44 does not directly control the condition relaxing means 28 in order to reflect statistics collected by the statistics collecting means 43 in the degree of condition relaxation by the condition relaxing means 28, but instead sends information about the statistics to the re-relaxing means 41, which in tern reflects the statistics collected by the statistics collecting means 43 in the degree of relaxation by the condition relaxing means 28. When causing the condition relaxing means 28 to further execute relaxation, the re-relaxing means 41 can reflect the statistics in the second relaxation.

If the first sensor 16 and/or the second sensor 17 is an acceleration sensor of sensors provided in the information processing apparatus 10, the first sensor 16 or the second sensor 17 can also act as the acceleration detection means 42, and therefore there is no need for providing a separate additional acceleration detector as the acceleration detection means 42. The purpose of collecting statistics is to adapt the degree of condition relaxation to the user of the information processing apparatus 10. For example, consider the case where the user performs work on the information processing apparatus 10 at a site, finishes the work, grasps the information processing apparatus 10, puts it in a bag, stands up, and then travels to another site. While the user is taking along the information processing apparatus 10, vibrations act on the housing of the information processing apparatus 10, even if the user does not drop the information processing apparatus 10. Different users have different characteristic ways of walking (quick or slow pace) and different ways of driving, which cause different characteristic vibrations of the information processing apparatus 10. Such characteristics are analyzed with statistics and appropriate condition relaxation adapted to the user is performed. For example, condition relaxation may be such that the second prediction is issued if acceleration acting on the information processing apparatus 10 remains within 1.2 times as high as the user's average acceleration obtained from statistics for at least a predetermined period of time. The condition relaxing means 28 may reflect the condition relaxation based on the degree of relaxation specified by the reflecting means 44 in the first relaxation. Alternatively, the condition relaxing means 28 may perform the first relaxation by using a predetermined relaxation degree independent of users and may reflect the relaxation specified by the reflecting means 44 in the second reflection it performs under the control of re-relaxing means 41.

Figure 4:
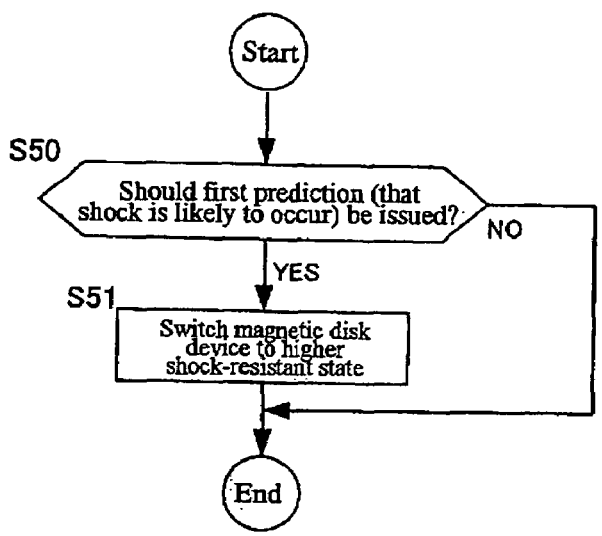
FIG. 4 is a flowchart of a first section of a first control method performed in the information processing apparatus.
Figure 5:
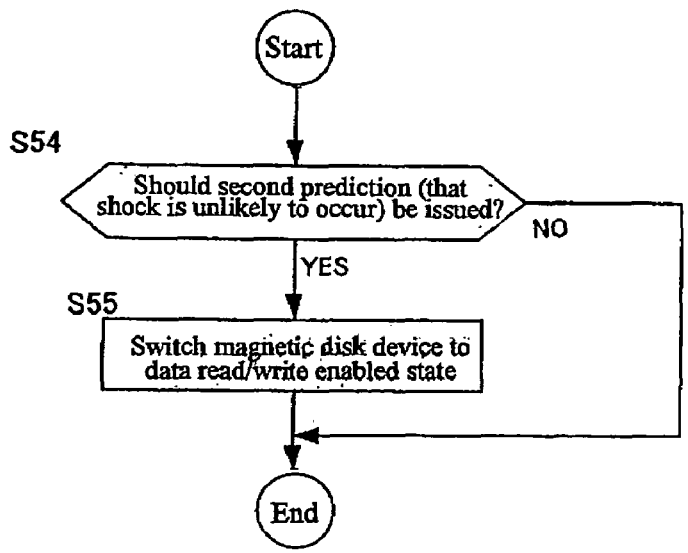
FIG. 5 is a flowchart of a second section of the first control method performed in the information processing apparatus.
Figure 6:
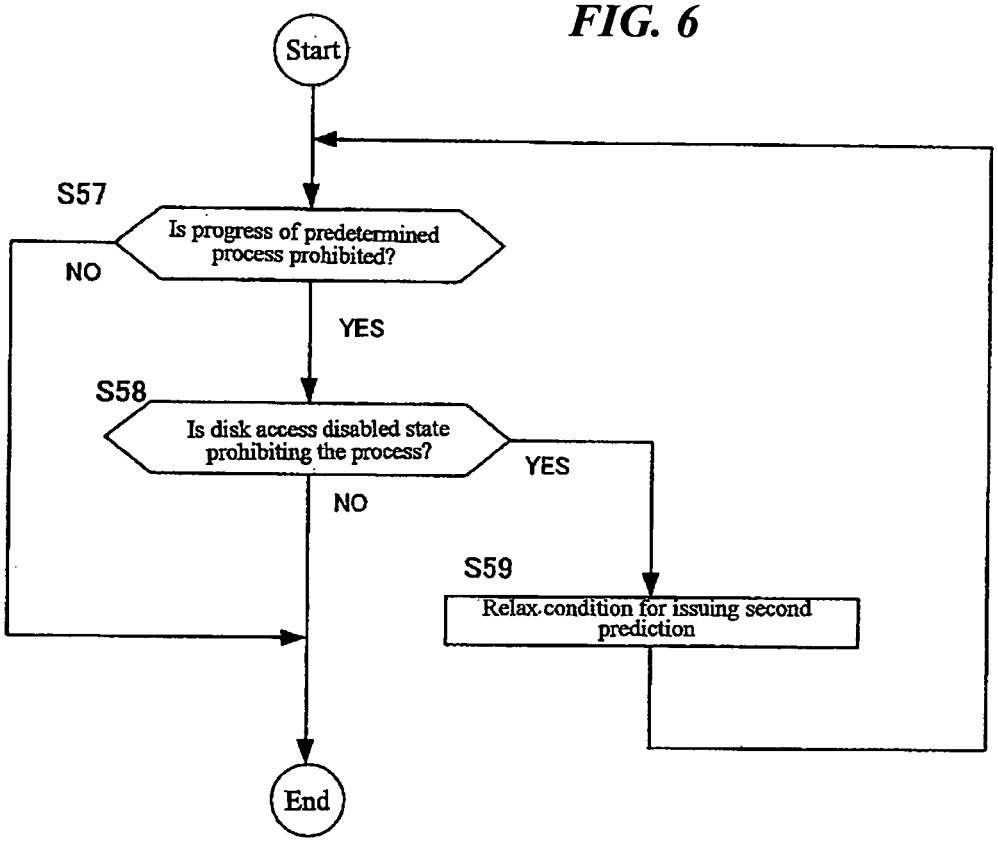
FIG. 6 is a flowchart of a third section of the first control method performed in the information processing apparatus.

FIGS. 4 to 6 are flowcharts of different sections of a first control method performed in an information processing apparatus 10. The routine in the flowchart shown in FIG. 4 is executed as a time interrupt routine at predetermined time intervals. The routine in the flowchart shown in FIG. 5 is executed as a time interrupt routine at predetermined time intervals after the completion of step S51 in FIG. 4. The routine shown in FIG. 6 is executed as a time interrupt routine at predetermined time intervals during a period from the start of a predetermined process to the end of the process. The time interrupt intervals of the routine shown in FIG. 4 may be 100 Hz, for example, in high risk mode, which is entered when a shock is likely to occur in the future, and 25 Hz in normal mode, which is entered when a shock is unlikely to occur. The information processing apparatus 10 to which this control method is applied includes as essential components: a magnetic disk device 13 that can be switched between a first shock-resistant state in which data can be written to or read from a magnetic disk by a head and a second shock-resistant state in which data cannot be written to or read from the magnetic disk by the head and shock resistance higher than that in the first shock-resistant state is provided; at least one first sensor 16 for detecting a first shock-predictive physical quantity, the first shock-predictive physical quantity being a basis for issuing a first prediction that a shock to the magnetic disk device 13 occurs; at least one second sensor 17 for detecting a second shock-predictive physical quantity, the second shock-predictive physical quantity being a basis for issuing a second prediction that a shock to the magnetic disk device 13 does not occur.

At step S50 in FIG. 4, determination is made based on an output from the first sensor 16 as to whether or not the first prediction should be issued. If the first prediction is issued (the determination at step S50 is YES), the magnetic disk device 13 is switched from the first shock-resistant state to the second shock-resistant state at step S51.

After the magnetic disk device 13 is switched from the first shock-resistant state to the second shock-resistant state (step S51 is performed), at step S54 in FIG. 5, determination is made based on an output from the second sensor 17 as to whether or not the second prediction should be issued. If the second prediction is issued (determination at step S54 is YES), the magnetic disk device 13 is switched from the second shock-resistant state to the first shock-resistant state at step S55.

In the routine in FIG. 6, if the progress of a predetermined process in the information processing apparatus 10 is prohibited because the magnetic disk device 13 is in the second shock-resistant state and data read/write in the magnetic disk device 13 is disabled (steps S57 and S58), a condition for the second prediction means 20 to issue the second prediction is relaxed (step S59). That is, determination is made at step S57 as to whether the progress of the predetermined process is prohibited and, if the determination is YES, the routine proceeds to step S58, otherwise the routine will end. At step S58, determination is made as to whether or not a disk access disabled state is prohibiting the process. If the determination is YES, the routine proceeds to step S59, otherwise the routine will end. At step S59, The condition for issuing the second prediction is relaxed.

The method for controlling the information processing apparatus 10 described in reference to FIGS. 4 to 6 can be embodied in various steps and additional sub-steps may be added. Some of various steps and additional sub-steps will be described below. These are presented only as illustrative examples of specific preferred embodiments of the present invention and do not limit the technical idea of the method of the present invention.

Figure 7:
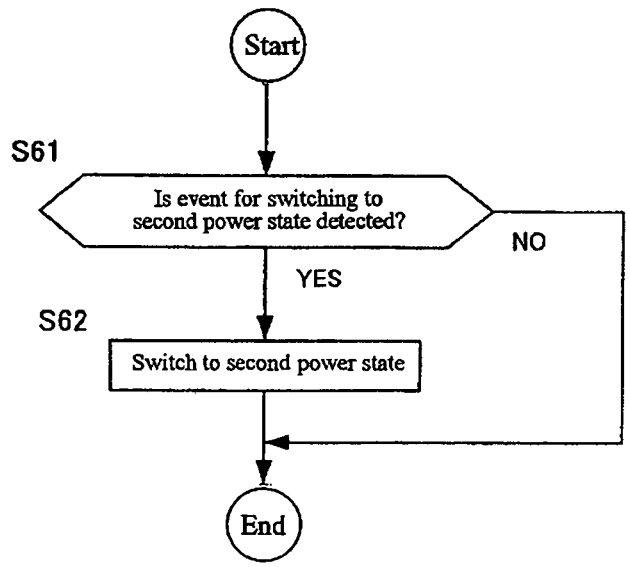
FIG. 7 is a flowchart of an example of a predetermined process shown in FIG. 6.

FIG. 7 is a flowchart of an example of the predetermined process provided in FIG. 6. One example of the predetermined process in FIG. 6 may be a process for changing the power status of the information processing apparatus 10. When an event is detected that provides a basis for switching the information processing apparatus 10 from a first power state to a second lower power state (step S61), the information processing apparatus 10 is switched from the first power state to the second power state based on an output from the event detection means 25 (step S62). While step S61 is shown in the routine in FIG. 7 for the sake of clarity, the event detection at step S61 may be used as an interrupt signal and step S62 may be an interrupt routine. In that case, when an event as the interrupt signal is detected, the routine at step S62 is executed. If the process at step S62 involves disk access in the magnetic disk device 13 and the disk access is suspended because of a disk access disabled state of the magnetic disk device 13, the progress at step S62 is prohibited and the determinations at steps S57 and S58 in FIG. 6 will be YES and step S59 in FIG. 6 will be executed.

For example, at step S54 (FIG. 5) a value corresponding to an output from the second sensor 17 is compared with a threshold to determine, based on the comparison, whether the second prediction should be issued. At step S59 (FIG. 6), the threshold is changed to relax the condition.

Figure 8:
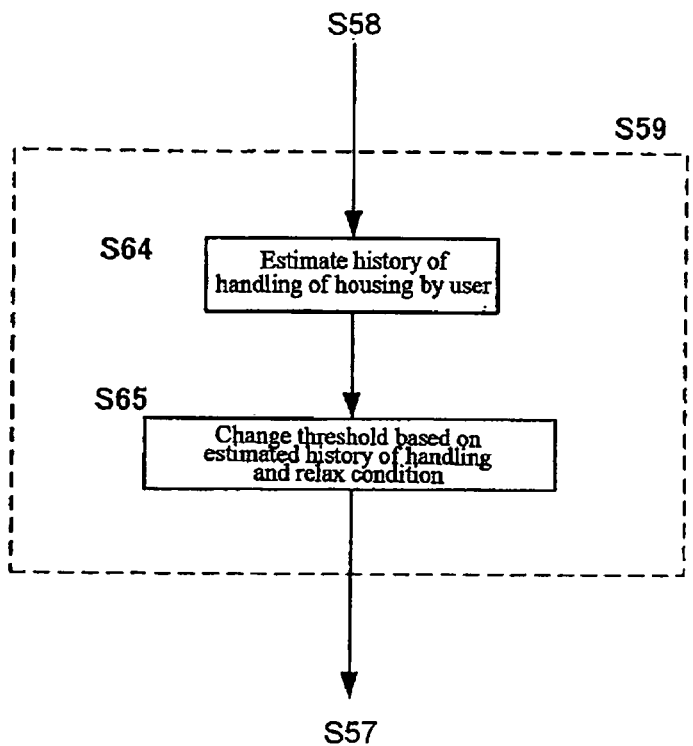
FIG. 8 is a flowchart of a process for relaxing the condition by changing a threshold.

FIG. 8 is a flowchart of a process for relaxing the condition by changing a threshold. Step S59 has sub-steps S64 and S65. At step S64, it is estimated based on an output from the first sensor 16 how the housing of the information processing apparatus 10 has been being handled by a user during a predetermined period of time including the point of time at which the magnetic disk device 13 was switched from the first shock-resistant state to the second shock-resistant state. At step S65, the threshold is changed according to the estimated status.

Returning to FIG. 5, in another specific form at step S54, the second prediction is issued based on pattern information relating to the time axis and/or frequency axis of outputs from the second sensor 17 at step S54. Examples of the pattern information are as follows.

(a) Pattern information relating to the time axis consists of a series of outputs based on comparison between outputs from the second sensor 17 and each threshold at different points of time. At step S59 (FIG. 6), a threshold is changed to relax the condition.

(b) Pattern information relating to the frequency axis consists of a set of outputs based on comparison between each frequency component of outputs from the second sensor 17 and each threshold. At step S59 (FIG. 6), a threshold is changed to relax the condition.

Figure 9:
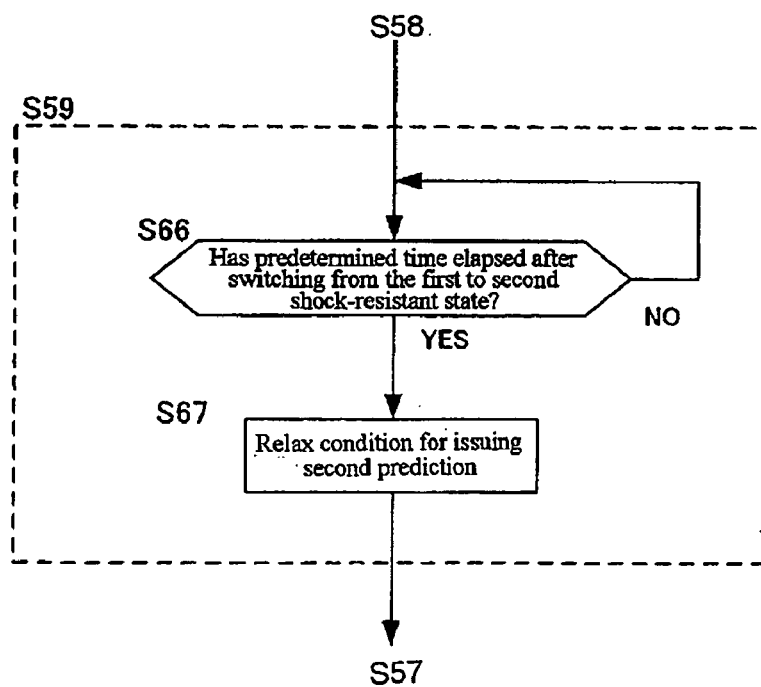
FIG. 9 is a main part of a flowchart of a routine for suspending condition relaxation.

FIG. 9 is a main part of a flowchart of a routine for suspending condition relaxation during a predetermined period of time after the magnetic disk device 13 is switched from the first shock-resistant state to the second shock-resistant state. Step S59 (FIG. 6) has sub-steps S66 and S67. At step S66, determination is made as to whether a predetermined period of time has elapsed after the switching of the magnetic disk device 13 from the first shock-resistant state to the second shock-resistant state (that is, after the completion of step S51). When the determination is YES, condition relaxation is performed at step S67.

Figure 10:
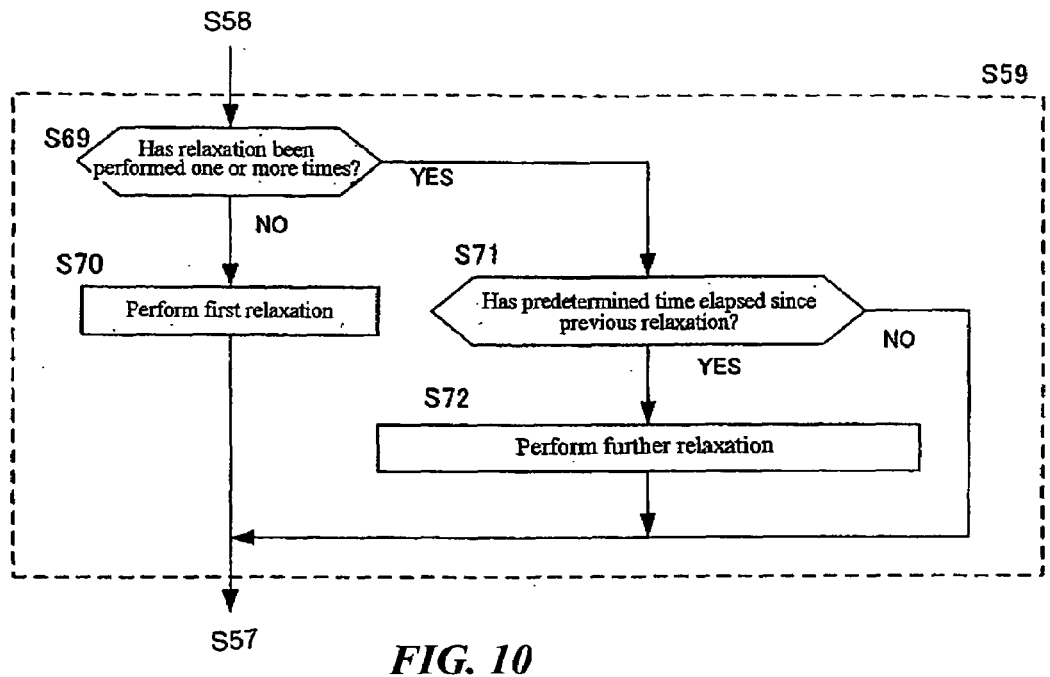
FIG. 10 is a main part of a flowchart of a routine for relaxing the condition more than once.

FIG. 10 is a main part of a flowchart of a routine for relaxing the condition more than once. Step S59 has sub-steps S69 to S72. In this routine, if the magnetic disk device 13 is still in the data read/write disabled state after a predetermined period of time has elapsed since the previous condition relaxation, the condition for issuing the second prediction is further relaxed based on an output from the second sensor 17. At step S59, if relaxation is performed for the first time, determination at step S69 as to whether condition relaxation has been performed one or more times is NO and the first relaxation is performed at step S70. When step S59 is re-executed after the first relaxation, determination at step S69 will be YES and the process proceeds to step S71. If it is determined at step S71 that a predetermined period of time has elapsed since the previous execution of step S59, the condition is further relaxed at step S72. As an example, for a user who tends to cause an extreme variation in acceleration but after a certain period of time decrease the amounts of variations in acceleration to less than a certain value and stabilize, needless condition relaxation is not performed until that period of time elapses if an extreme variation in acceleration is detected at the start of switching to a power-saving state. Then, after that period has elapsed, the condition is relaxed so that up to a level somewhat higher than that stabilized acceleration variation level is tolerated. Thus, a quick and safe switching to a power-saving state can be achieved (because needless relaxation is not performed when an extreme variation in acceleration occurs).

Figure 11:
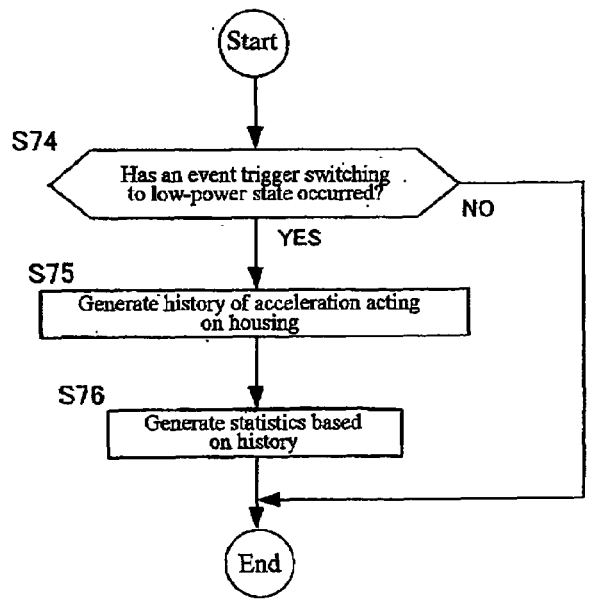
FIG. 11 is a flowchart of a routine for collecting statistics concerning a history of acceleration acting on the information processing apparatus around the time at which the magnetic disk device was switched from the first to second shock-resistant state.
Figure 12:
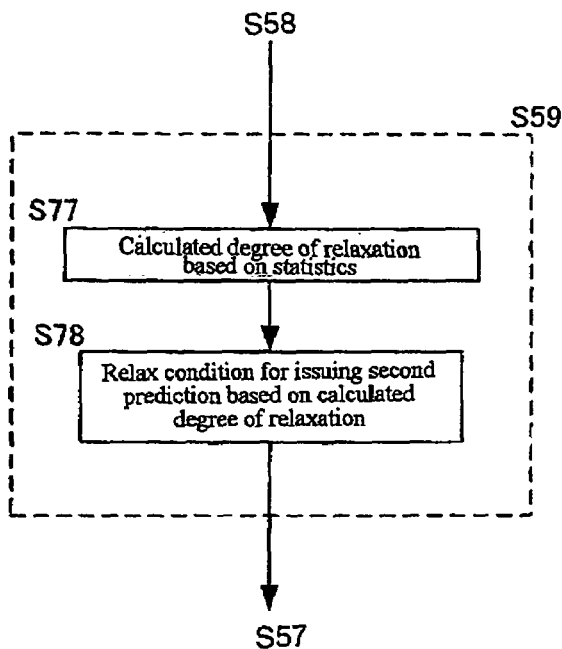
FIG. 12 is a diagram showing details of a step for relaxing a condition for issuing a second prediction according to statistics generated by the routine in FIG. 11.

In another embodiment of the method for controlling an information processing apparatus 10, the control method includes the step of collecting statistics of a history of acceleration acting on the housing of the information processing apparatus 10 after an event is detected. In this embodiment, step S59 has the sub-steps of reflecting the statistics in the degree of condition relaxation. FIG. 11 is a flowchart of a routine for collecting statistics concerning a history of acceleration acting on the information processing apparatus 10 around the time at which the magnetic disk device 13 was switched from the first to second shock-resistant state. At step S74, determination is made as to whether an event has occurred that switches the magnetic disk device 13 from the first shock-resistant state to the second shock-resistant state. If the determination is YES, a history of acceleration acting on the housing of the information processing apparatus 10 is generated. In this way, each time the event occurs, a history of user-produced acceleration acting on the housing of the information processing apparatus 10 is generated and stored. At step S76, statistics are generated from a predetermined number of histories stored. From the statistics, it can be estimated how much acceleration and in what manner the user typically exerts on the housing after an event occurs. FIG. 12 shows in detail the step of relaxing the condition for issuing the second prediction according to the statistics generated by the routine shown in FIG. 11. Step S59 has sub-steps S77 and S78. At step S77, the degree of relaxation is calculated from the statistics generated at step S76. At step S78, the condition is relaxed according to the degree of relaxation calculated at step S77.

A program according to the present invention causes a computer to function as the means included in the information processing apparatuses 10 according to the best mode of the present invention described above. Alternatively, a program according to the present invention causes a computer to perform the steps of the control method according to the best mode of the information processing apparatus 10. A recording medium (for example, CD, DVD, FD, MO, or semiconductor memory) according to the present invention has such program recorded on it in a computer-readable manner.

Figure 13:
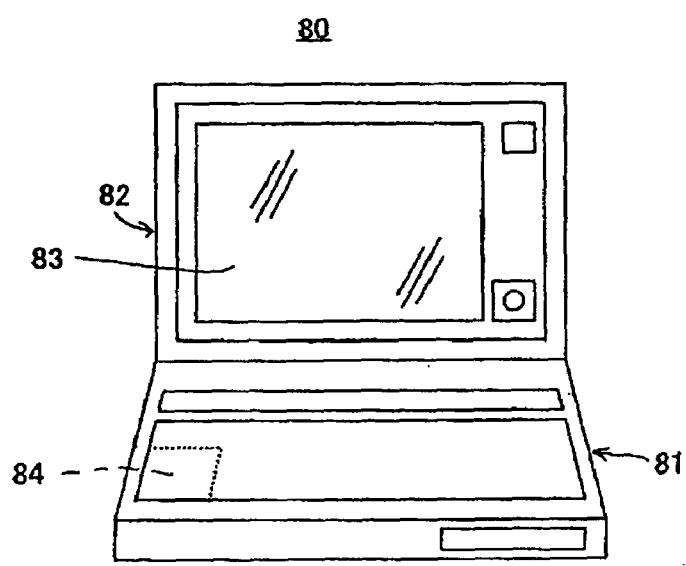
FIG. 13 is a perspective view of a notebook PC.

FIG. 13 is a perspective view of a notebook PC 80. The notebook PC 80 contains an internal, rechargeable battery (not shown) and normally operates on the rechargeable battery. The notebook PC 80 can also operate from commercial power supply (external AC power supply) through a power cord, as appropriate. Furthermore, the rechargeable battery is recharged while the PC 80 is connected to a commercial power supply. The notebook PC 80 includes a PC system unit 81 and a lid 82. The lid 82 is rotatably hinged to the edge of the PC system unit 81 that is away from a user using the notebook PC 80 and covers and uncovers the top surface of the PC system unit 81. An LCD 83 having appropriate dimensions is attached to the surface of the lid 82 that faces the user when the lid 82 is at its open position. A hard disk device 84 has a given storage capacity and is contained in the PC system unit 81.

Figure 14:
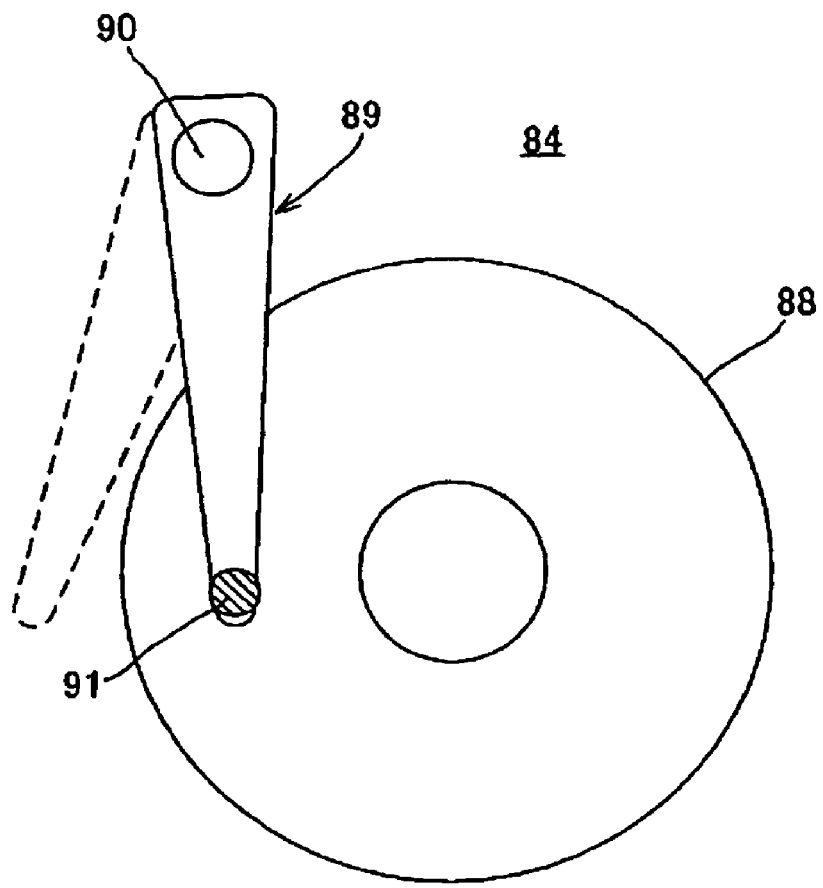
FIG. 14 is a schematic diagram illustrating a swing position of a swinging arm in a hard disk device.

FIG. 14 is a schematic diagram illustrating the swing position of a swinging arm 89 in a hard disk device 84. A magnetic disk 88 has a surface for recording data. The swinging arm 89 can swing about an axis line parallel to the axis of rotation of the magnetic disk 88 on a supporting shaft 90 at the swinging arm's anchor end and has a magnetic head 91 at the opposite end. When the hard disk device 84 writes or reads data, the swinging arm 89 is positioned at the first swing position (indicated by a solid line; hereinafter referred to as the "load position") so that the magnetic head 91 faces the recording surface of the magnetic disk 88. The hard disk device 84 can switch the position of the arm 89 to the second swing position departured from the magnetic disk 88 (indicated by a dashed line; hereinafter referred to as the "unload position") in response to a control signal from an external source so that it does not face the magnetic disk 88. When the swinging arm 89 is at the unload position, data cannot be read/written in the hard disk device 84 but the magnetic head 91 is kept from contact with the magnetic disk 88 even if an external shock is given to the hard disk device 84, thus an adequate shock resistance is ensured compared with when it is at the load position.

Figure 15:
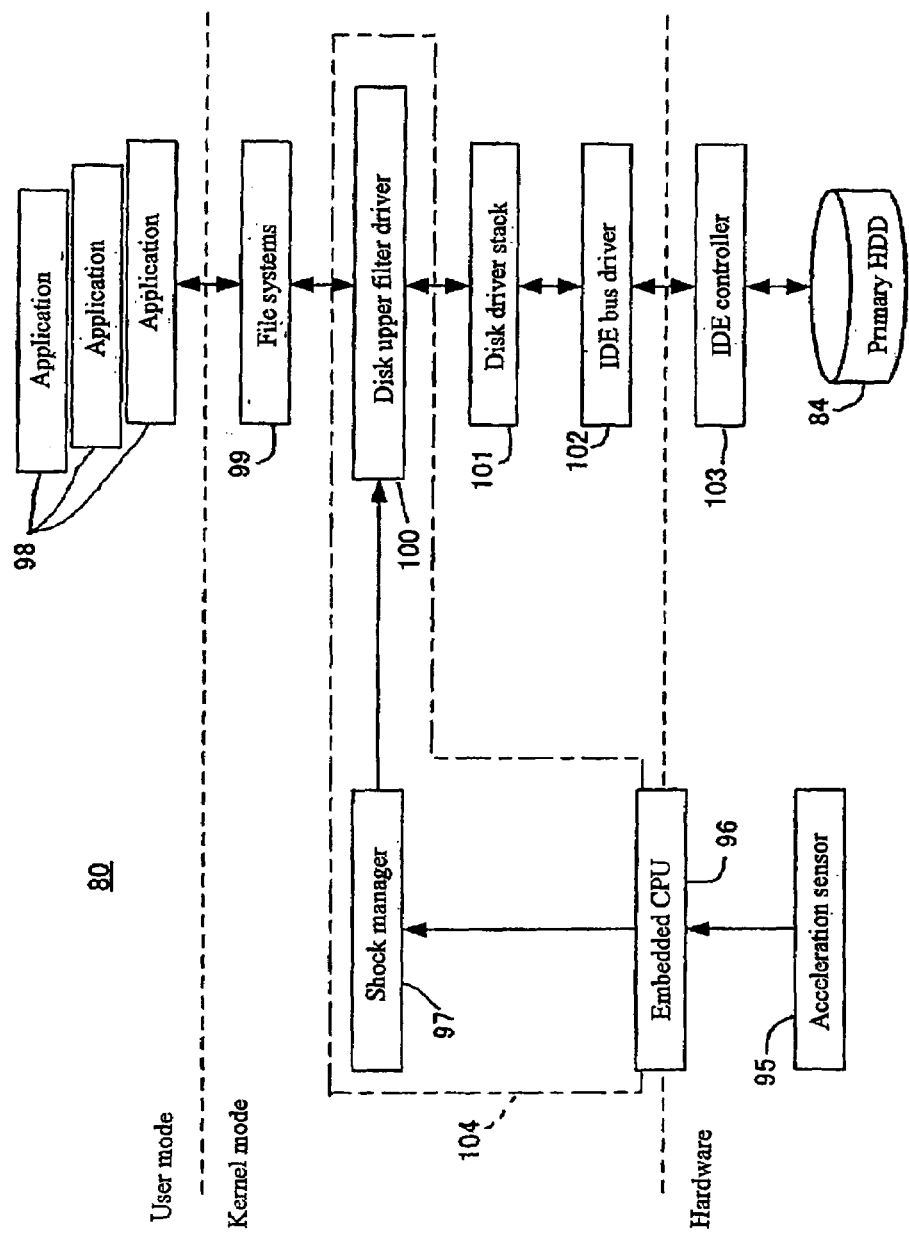
FIG. 15 is a schematic diagram showing a configuration of a notebook PC including a mechanism for protecting the hard disk device.

FIG. 15 is a schematic diagram showing a configuration of the notebook PC 80 including a mechanism for protecting the hard disk device 84. Kernel mode and user mode are executed in a time sharing manner in a CPU of the notebook PC 80. The blocks shown in the kernel mode section in FIG. 15 are implemented by the CPU under the control of a program in the notebook PC 80. The program that controls the CPU to implement these functions is provided in the form of a magnetic disk, optical disk, semiconductor memory, or other storage medium on which the program is recorded or delivered over a network. The program is installed in the hard disk device 84, then loaded into memory in the notebook PC 80, and executed by the CPU. The notebook PC 80 includes as its hardware the hard disk device 84, an acceleration sensor 95, and an IDE controller 103. The acceleration sensor 95 is provided in the housing of the notebook PC 80 and detects acceleration acting on the notebook PC 80. The term "acceleration sensor" as used herein means an inertia sensor that measures linear or angular acceleration. Typically, an accelerometer means a linear accelerometer. A variety of angular accelerometers include a gyroscope (angular speedometer). The present invention can be implemented with any of such sensors with somewhat different manners.

An embedded CPU 96 is provided in the notebook PC 80 separately from the CPU that executes the kernel mode and user mode. The embedded CPU 96 includes the function of converting analog inputs from the hardware elements to digital and the function of buffering inputs from the sensors in a FIFO (First-In First-Out) order and providing them to a shock manager 97. The shock manager 97 receives an output from the acceleration sensor 95 through the embedded CPU 96. The notebook PC 80 also includes, as ordinary functions, applications 98 for executing a variety of specific processes and file systems 99 provided by an operating system (OS). Between the file systems 99 and the IDE controller 103 there are provided a disk upper filter driver 100, a disk driver stack 101, and an IDE bus driver 102, in this order from the closest to the file systems 99. An application 98 typically accesses (reads/writes) a data file in the hard disk device 84 through the file systems 99 provided by the OS. The file systems 99 manage how data files consisting of a collection of data stored in the hard disk device 84 are actually organized and hide this from the applications 98, thereby simplifying the use of hard disk device 84 by the applications 98. It is the disk driver stack 101 and the IDE bus driver 102 that actually access the hard disk device 84. The disk upper filter driver 100 is provided between the file systems 99 and the disk driver stack 101 and transfers a direction from the shock manager 97 to the disk driver stack 101. The shock manger 97 and the disk upper filter driver 100 make up a protection mechanism 104. The shock manager 97 controls the hard disk device 84 to switch between the load position and the unload position through the disk upper filter driver 100. When the shock manager 97 switches the hard disk device 84 to the load position or unload position through the disk upper filter driver 100, it issues a load command or an unload command to the disk upper filter driver 100.

Figure 16:
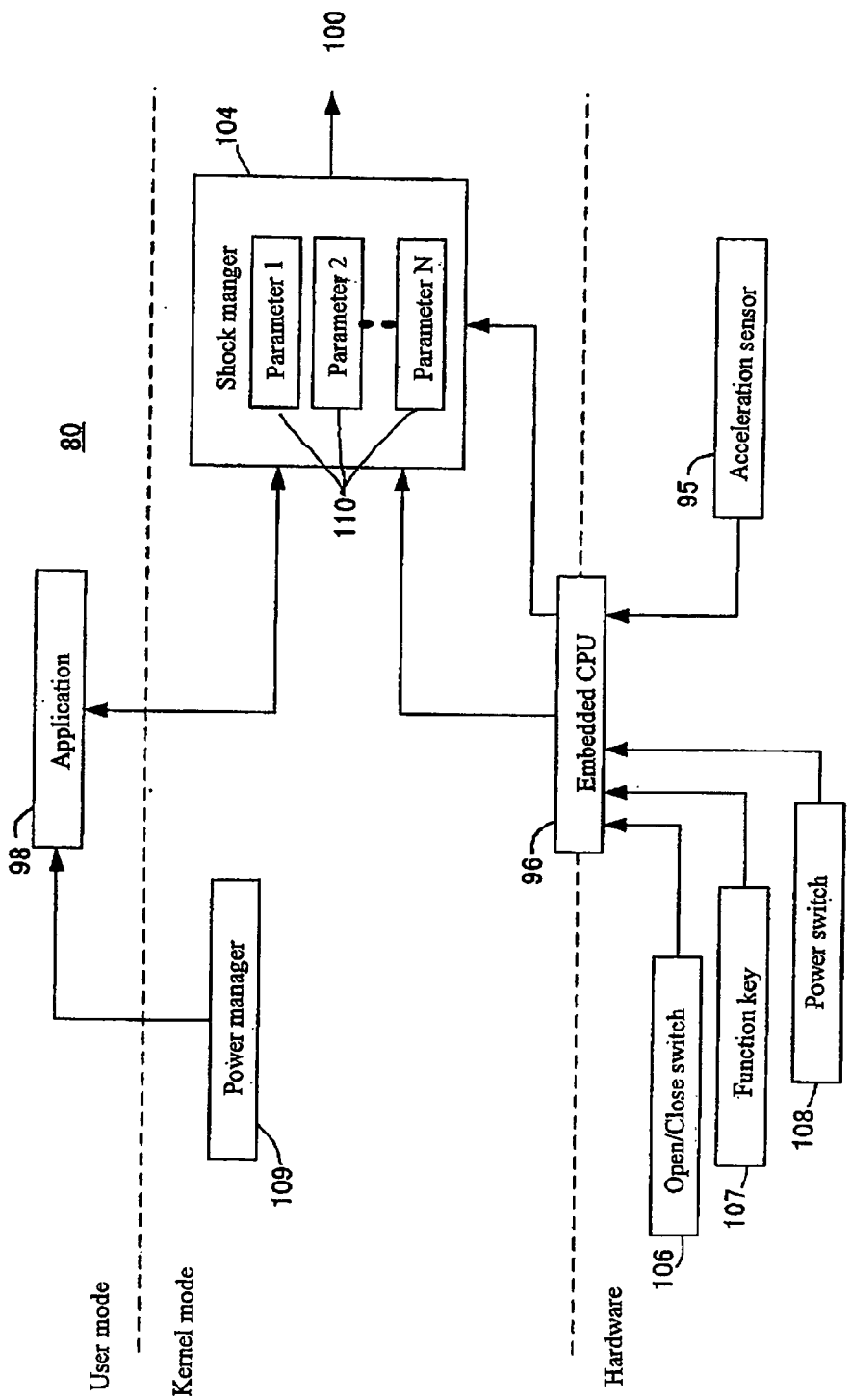
FIG. 16 is a schematic diagram illustrating the relationship between power status switching of the notebook PC and a shock manager.

FIG. 16 is a schematic diagram illustrating the relationship between power status switching of the notebook PC 80 and the shock manager 97. The power manager 109 manages the power status, such as a normal power state and a power-saving state, of the notebook PC 80. The notebook PC 80 includes as hardware elements an acceleration sensor 95, an open/close switch 106, a function key 107, and a power switch 108. The open/close switch 106 detects the open/close state of the lid 82. The function key 107 is provided on the top surface of the PC system unit 81 of the notebook PC 80. A user operates the function key 107 when the user wants to place the notebook PC 80 in a power-saving state. The power switch 108 is also provided in the notebook PC 80 and operated by the user to power on or off the notebook PC 80. The user can place the notebook PC 80 in suspend mode by holding down the power switch 108 for a predetermined time. An output from the acceleration sensor 95 is provided to the shock manager 97 through the embedded CPU 96.

The shock manager 97 predicts a possible shock to the notebook PC 80 based on output information from the acceleration sensor 95 and uses output information from the open/close switch 106, the function key 107, and the power switch 108 as an event for power status switching. The shock manager 97 may use notification from an application 98 as an event for power status switching, instead of output information provided from the open/close switch 106, the function key 107, and the power switch 108 through the embedded CPU 96. This is because before the OS switches the power status from the normal power state to a power-saving state according to output information from any of the open/close switch 106, function key 107, and power switch 108, the OS notifies all active applications 98 of the power status switching event. Therefore, a given application 98 can be arranged so that if the application 98 receives notification of a power status switching event from the OS, the application 98 notifies the shock manager 97 of the event. Thus the shock manager 97 can know the occurrence of a power status switching event. The shock manager 97 receives notification of a power status switching event from an application 98 and also receives output information provided from a hardware elements such as the open/close switch 106 through the embedded CPU 96 and estimates in detail what state the notebook PC 80 was in when the event occurred. Accordingly, more appropriate status switching of the hard disk device 84 can be achieved. For example, if the shock manager 97 receives an event notification from an application 98 while the lid 82 is open, the shock manager 97 estimates that the notebook PC 80 is not being moved a long distance. On the other hand, if the shock manager 97 receives an event notification from an application 98 while the lid 82 is closed, it estimates that the user will travel a relatively long distance with the notebook PC 80. According to such estimation, the shock manger 97 determines the degree of risk of a drop of the notebook PC 80 and, according to the degree, differently sets a relaxation condition for the hard disk device 84 to return to the load position. The shock manager 97 controls the condition for switching between the load position and unload position in the hard disk device 84 according to a plurality of parameters 110. The plurality of parameters 110 correspond to threshold values Ra, Rb, Rc, . . . shown in FIG. 3.

Figure 17:
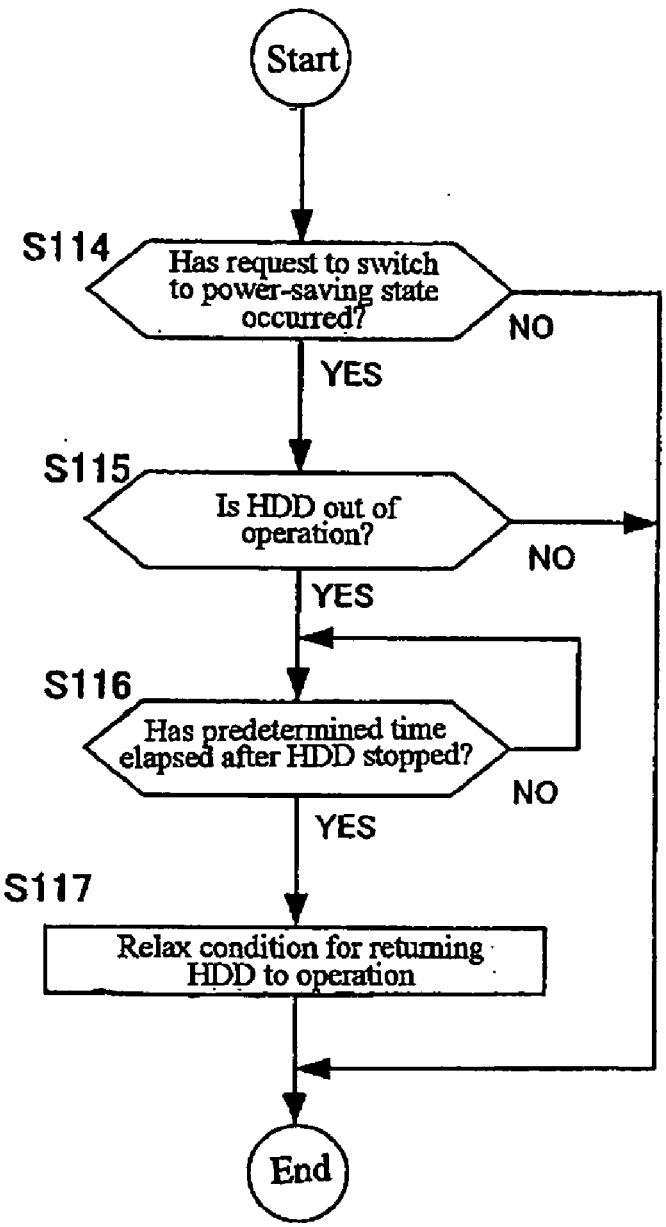
FIG. 17 is a flowchart of a method for controlling the notebook PC.

FIG. 17 is a flowchart of a method for controlling the notebook PC 80. At step S114, determination is made as to whether an event, such as switching of the lid 82 from its open position to its close position detected by the open/close switch 106, for example, has occurred. If the determination is YES, the method proceeds to step S115, otherwise the method will end. At step S115, determination is made as to whether the hard disk device 84 is operating or not, that is, whether it is in a data read/write disabled state or not. If the determination is YES, the control method proceeds to step S116, otherwise the control method will end. At step S116, determination is made as to whether a predetermined period of time (for example 20 seconds) has elapsed since the hard disk device 84 stopped operating. When the time elapsed, the method proceeds to step S117. At step S117, the condition for returning the hard disk device 84 to operation, that is, returning the notebook PC 80 to a data read/write enabled state, is changed. The meaning of performing step S116 is to prevent the hard disk device 84 from returning to operation and maintain the protection state during a period of time because the possibility of a shock to the notebook PC 80 is high during a certain period of time after the shock manager 97 places the hard disk device 84 in a protection state based on prediction of a future shock to the notebook PC 80. As has been described, if a process for switching the notebook PC 80 from its normal power state to a power-saving state is temporarily suspended due to measures for protecting the hard disk device 84 that have activated a prediction of a possible shock to the notebook PC 80, this method can minimize the suspension period.

Figure 18:
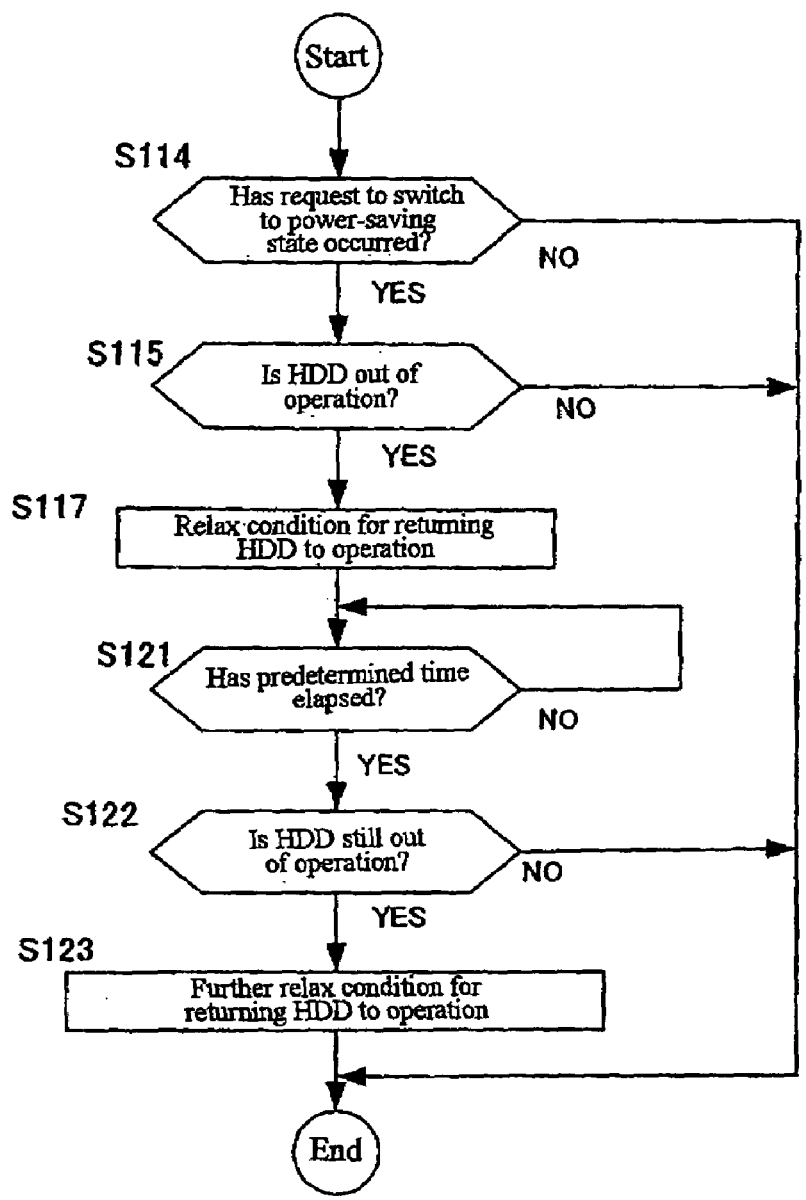
FIG. 18 is a flowchart of another method for controlling the notebook PC.

FIG. 18 is a flowchart of another method for controlling the notebook PC 80. The flowchart in FIG. 18 differs from the flowchart in FIG. 17 in that step S116 in FIG. 17 is removed and instead, steps S121 to S123 are added after step S117. If it is determined at step S115 that the read/write function of the hard disk device 84 is out of operation, the condition for returning the hard disk device 84 to operation is immediately relaxed at step S117. The relaxation of the condition at step S117 is the first relaxation. It should be noted that even if the condition is relaxed at steps S117 and S123, which will be described later, the hard disk device 84 is prevented from returning to operation during a period in which a future shock to the notebook PC 80 is predicted with a sufficiently high possibility or a shock has really occurred because the relaxed condition is not met. At step S121, determination is made as to whether a predetermined period of time has elapsed since the first condition relaxation at step S117. When the time has elapsed, the method proceeds to step S122. At step S122, as in step S115, determination is made as to whether the hard disk device 84 is out of operation. If the determination is NO, the control method will end. If YES, the method proceeds to step S123. At step S123, the condition is further relaxed from the condition relaxed at step S117. The amount of acceleration acting on the notebook PC 80 differs from user to user carrying it under the same movement condition while a user is traveling with the PC 80. If the user is a fast walker, a large acceleration may continuously act on the notebook PC 80 even though the notebook PC 80 is in a predetermined safe state while the user is walking and, as a result, the hard disk device 84 may persistently be kept in a read/write disabled state even though the notebook PC 80 is in a sufficiently safe state. For such a user, the hard disk device 84 can be quickly returned to operation by performing step S123.

Although the present invention has been described using illustrated embodiments, the technical scope of the present invention is not limited to the scope described. It is readily apparent to those skilled in the art that it is possible to add various alterations or modifications without departing from the scope and spirit of the present invention as defined by the appended claims.

What is claimed is:

1. A portable information processing apparatus comprising:
   a magnetic disk device switchable between a first shock-resistant state in which data access to a magnetic disk by a head is enabled and a second shock-resistant state in which data access to the magnetic disk by the head is disabled where said second shock-resistant state provides increased shock resistance as compared to said first shock-resistant state;
   at least one first sensor for detecting a first shock-predictive physical quantity, said first shock-predictive physical quantity being a basis for issuing a first prediction that a shock to said magnetic disk device is likely;
   at least one second sensor for detecting a second shock-predictive physical quantity, said second shock-predictive physical quantity being a basis for issuing a second prediction that a shock to said magnetic disk device is not likely;
   first prediction means for issuing the first prediction in response to an output from said first sensor;
   first magnetic disk device switching means for switching said magnetic disk device from the first shock-resistant state to the second shock-resistant state in response to the first prediction;
   second prediction means for issuing the second prediction in response to an output from said second sensor after said first magnetic disk device switching means switches said magnetic disk device from the first shock-resistant state to the second shock-resistant state;
   second magnetic disk device switching means for switching said magnetic disk device from the second shock-resistant state to the first shock-resistant state in response to the second prediction; and
   condition relaxing means for relaxing a condition for issuing the second prediction in response to a delay of a predetermined process in said information processing apparatus caused by the disabled data access due to the second shock-resistant state of said magnetic disk device.

2. The information processing apparatus according to claim 1, further comprising:
   at least one event detection means for detecting an event indicating a switch of said information processing apparatus from a first power state to a second power state, said second power state being a lower power state than said first power state; and
   power status switching means for switching said information processing apparatus from said first power state to second power state in response to an output from said event detection means;
   wherein said predetermined process is a power status switching process performed by said power status switching means.

3. The information processing apparatus according to claim 2, further comprising:
   acceleration detection means for detecting acceleration acting on the housing of said information processing apparatus;
   statistics collecting means for collecting statistics concerning a history of the acceleration acting on the housing of said information processing apparatus after said event detection means detects an event; and
   reflecting means for reflecting the statistics collected by said statistics collecting means in the degree of condition relaxation by said condition relaxing means.

4. The information processing apparatus according to claim 1, wherein said first shock-resistant state is a state in which the head of said magnetic disk device faces the magnetic disk and said second shock-resistant state is a state in which the head of said magnetic disk device does not face the magnetic disk.

5. The information processing apparatus according to claim 1, wherein:
   said second prediction means compares a value relating to the output from said second sensor with a threshold and issues said second prediction on the basis of the result of the comparison; and
   said condition relaxing means relaxes said condition by changing said threshold.

6. The information processing apparatus according to claim 5, wherein said first magnetic disk device switching means comprises status estimation means for estimating a status of said information processing apparatus, said status representing how said information processing apparatus is being used by a user when said first magnetic disk device switching means switches said magnetic disk device from said first shock-resistant state to said second shock-resistant state; and
   said condition relaxing means changes the threshold according to said status estimated by said status estimation means.

7. The information processing apparatus according to claim 1, wherein said second prediction means issues said second prediction on the basis of pattern information relating to a time axis and/or a frequency axis of an output from said second sensor.

8. The information processing apparatus according to claim 7, wherein said pattern information relating to the time axis consists of a series of outputs based on the result of comparisons between an output from said second sensor and a threshold at successive points in time; and
   said condition relaxing means relaxes said condition by changing said threshold.

9. The information processing apparatus according to claim 7, wherein said pattern information relating to the frequency axis consists of a set of outputs based on comparisons between each frequency component of an output from said second sensor and a threshold; and
   said condition relaxing means relaxes said condition by changing said threshold.

10. The information processing apparatus according to claim 1, further comprising prohibition means for prohibiting said condition relaxing means from relaxing the condition during a predetermined time period after said first magnetic disk device switching means switches said magnetic disk device from said first shock-resistant state to said second shock-resistant state.

11. The information processing apparatus according to claim 1, further comprising re-relaxing means for causing said condition relaxing means to further relax the condition for issuing said second prediction if a data read/write disabled state of said magnetic disk device persists for a predetermined time period after said condition relaxing means relaxes the condition.

12. A method for controlling a portable information processing apparatus comprising:
   issuing a first prediction that a shock is likely to a magnetic disk device of the portable information processing apparatus in response to a first output from a first sensor, where said first sensor issues said first output in response to detecting a first shock predictive physical quantity;
   in response to said first prediction, switching said magnetic disk device from a first shock-resistant state in which data access to a magnetic disk by a head is enabled to a second shock-resistant state in which data access to the magnetic disk by the head is disabled, where said second shock-resistant state provides increased shock resistance as compared to said first shock-resistant state;
   issuing a second prediction that a shock is not likely to occur to said magnetic disk device after said magnetic disk device is switched from the first shock-resistant state to the second shock-resistant state and in response to a second output from a second sensor, where said second sensor issues said second output in response to detecting a second shock predictive physical quantity;
   switching said magnetic disk device from the second shock-resistant state to the first shock-resistant state in response to the second prediction; and
   relaxing a condition for issuing the second prediction in response to a delay of a predetermined process in said information processing apparatus caused by the disabled data access due to the second shock-resistant state of said magnetic disk device.

13. The control method according to claim 12, further comprising:
   detecting an event indicating a switch of said information processing apparatus from a first power state to a second power state, said second power state being a lower power state than said first power state; and
   switching said information processing apparatus from said first power state to said second power state in response to said detection;
   wherein said predetermined process in said information processing apparatus is said step of switching said power state of said information processing apparatus.

14. The control method according to claim 12, wherein:
a value relating to the second output is compared with a threshold and a determination is made as to whether or not said second prediction should be issued on the basis of the result of the comparison; and
the condition for issuing said second prediction is relaxed by changing said threshold.

15. The control method according to claim 14, further comprising estimating a status of said information processing apparatus on the basis of said first output, said status representing how said information processing apparatus is being used by a user during a predetermined time period including the point of time at which said magnetic disk device is switched from said first shock-resistant state to said second shock-resistant state;
wherein relaxing said condition for issuing the second prediction comprises changing the threshold on the basis of said estimated status.

16. The control method according to claim 12, wherein said second prediction is issued on the basis of pattern information relating to a time axis and/or a frequency axis of the second output.

17. The control method according to claim 12, wherein the condition for issuing said second prediction is prohibited from being changed during a predetermined time period after said magnetic disk device is switched from said first shock-resistant state to said second shock-resistant state.

18. The control method according to claim 12, wherein the condition for issuing said second prediction is further relaxed in response to a data read/write disabled state of said magnetic disk device persisting after a lapse of a predetermined time period after the condition for issuing said second prediction is relaxed.

19. A computer-readable medium having embodied thereon computer-readable instructions effective when executing on a portable information processing apparatus to:
issue a first prediction that a shock is likely to a magnetic disk device of the portable information processing apparatus in response to a first output from a first sensor, where said first sensor issues said first output in response to detecting a first shock predictive physical quantity;
in response to said first prediction, switch said magnetic disk device from a first shock-resistant state in which data access to a magnetic disk by a head is enabled to a second shock-resistant state in which data access to the magnetic disk by the head is disabled, where said second shock-resistant state provides increased shock resistance as compared to said first shock-resistant state;
issue a second prediction that a shock is not likely to occur to said magnetic disk device after said magnetic disk device is switched from the first shock-resistant state to the second shock-resistant state and in response to a second output from a second sensor, where said second sensor issues said second output in response to detecting a second shock predictive physical quantity;
switch said magnetic disk device from the second shock-resistant state to the first shock-resistant state in response to the second prediction; and
relax a condition for issuing the second prediction in response to a delay of a predetermined process in said information processing apparatus caused by the disabled data access due to the second shock-resistant state of said magnetic disk device.

20. The medium according to claim 19 further comprising computer readable instructions effective when executing on said apparatus to:
detect an event indicating a switch of said information processing apparatus from a first power state to a second power state, said second power state being a lower power state than said first power state; and
switch said information processing apparatus from said first power state to said second power state in response to said detection;
wherein said predetermined process in said information processing apparatus is said step of switching said power state of said information processing apparatus.

21. The medium according to claim 19 wherein said computer-readable instructions are effective when executing on said apparatus to:
compare a value relating to the second output with a threshold and make a determination as to whether said second prediction should be issued on the basis of the result of the comparison; and
relax the condition for issuing said second prediction, when indicated, by changing said threshold.

22. The medium according to claim 19 further comprising computer-readable instructions effective when executing on said apparatus to prohibit the condition for issuing said second prediction from being changed during a predetermined time period after said magnetic disk device is switched from said first shock-resistant state to said second shock-resistant state.

23. The medium according to claim 19 further comprising computer-readable instructions effective when executing on said apparatus to further relax the condition for issuing said second prediction in response to a data read/write disabled state of said magnetic disk device persisting after a lapse of a predetermined time period after the condition for issuing said second prediction is relaxed.

* * * * *